United States Patent [19]

Durand et al.

[11] Patent Number: 5,801,114

[45] Date of Patent: Sep. 1, 1998

[54] CATALYSTS SELECTIVE FOR THE REDUCTION OF NITROGEN OXIDES TO NITROGEN IN AN OXIDIZING MEDIUM, A PROCESS FOR THEIR PREPARATION AND THEIR USE

[75] Inventors: Daniel Durand, Rueil Malmaison; Gil Mabilon, Carrieres Sur Seine; Nicolas Des Courtils, Garches, all of France

[73] Assignee: Institut Francais du Petrole, France

[21] Appl. No.: 584,125

[22] Filed: Jan. 11, 1996

[30] Foreign Application Priority Data

Jan. 11, 1995 [FR] France .................. 95 00259

[51] Int. Cl.⁶ .......................... B01J 23/02
[52] U.S. Cl. .......... 502/302; 502/303; 502/328; 502/330; 502/332; 502/334; 502/339; 502/340; 502/341; 502/344; 502/346; 502/347; 502/348; 423/213.5; 423/239.1
[58] Field of Search .................. 502/302, 303, 502/328, 330, 332, 334, 339, 340, 341, 344, 346, 347, 348; 423/213.5, 239.1

[56] References Cited

U.S. PATENT DOCUMENTS 4,975,406  12/1990  Frestand et al. ............ 502/302
5,474,965  12/1995  Nakatsuji et al. ........... 502/330

FOREIGN PATENT DOCUMENTS

| 0 577 438 | 1/1994 | European Pat. Off. . |
| 0 602 602 | 6/1994 | European Pat. Off. . |
| 0 605 251 | 7/1994 | European Pat. Off. . |
| 605 251 | 7/1994 | European Pat. Off. . |
| 24 40 433 | 3/1975 | Germany . |
| 40 08 371 | 9/1990 | Germany . |

*Primary Examiner*—Shrive Beck
*Assistant Examiner*—Timothy Meeks
*Attorney, Agent, or Firm*—Millen, White, Zelano & Branigan, P.C.

[57] ABSTRACT

A catalyst which is active and selective for the reduction of nitrogen oxides to molecular nitrogen by reducing agents in a medium which is superstoichiometric in oxidizing agents such as carbon monoxide, hydrogen, hydrocarbons, alcohols and other oxygen-containing organic compounds. The active phase of this catalyst is as follows:
at least one inorganic refractory oxide;
at least one rare earth element (A);
at least one alkaline-earth element (B);
at least one platinum group metal (C); and
at least one silver or gold metal (D).

Impregnation of (C) is advantageously followed by heat treatment in a reducing atmosphere.

31 Claims, No Drawings

CATALYSTS SELECTIVE FOR THE REDUCTION OF NITROGEN OXIDES TO NITROGEN IN AN OXIDIZING MEDIUM, A PROCESS FOR THEIR PREPARATION AND THEIR USE

BACKGROUND OF THE INVENTION

The present invention concerns catalysts for the elimination of nitrogen oxides (NO and $NO_2$, termed $NO_x$), a process for their preparation and their use in a medium which is superstoichiometric in oxidizing agents. These catalysts are characterized by high activity at low temperatures and good selectivity for the conversion of nitrogen oxides to molecular nitrogen to the detriment of the undesirable formation of nitrous oxide ($N_2O$).

These catalysts can, inter alia, cause the elimination of the nitrogen oxides present in the exhaust gases from automotive or stationary engines using weak mixtures, whether they be compression-ignition engines or lean burn spark ignition engines. These catalysts can also be used to eliminate nitrogen oxides from the fumes from power stations, waste incinerators or gas turbines. These gases are characterized by nitrogen oxide contents of several tens to several thousands of parts per million (ppm), by comparable contents of reducing compounds (CO, $H_2$, hydrocarbons), but above all by high concentrations of oxygen (1 to close to 20% by volume).

The high toxicity of nitrogen oxides, and their role in the formation of acid rain and tropospheric ozone has led to severe standards being set to limit the emissions of these compounds. To comply with these standards, it is generally necessary to eliminate at least a portion of these oxides present in the exhaust gases from automotive or stationary engines, turbines or power stations and incinerators.

Nitrogen oxides can be eliminated by thermal decomposition or preferably by a catalytic route, but the high temperatures demanded by this reaction are incompatible with those of the exhaust gases. They can only be reduced by the reducing agents present in small amounts in the exhaust gas (CO, $H_2$, unburned hydrocarbons or hydrocarbons where combustion in the engine was not perfect), and also by additional reducing agents which must be injected upstream of the catalyst. These reducing agents are hydrocarbons, alcohols, ethers or other oxygen-containing compounds.

The catalysts of the invention can also cause nitrogen oxide reduction using the fuel for the vehicle as the reducing agent. Examples of this type of fuel are petrols, with or without oxygen-containing compounds as additives (for example alcohols or ethers), gas oils, liquefied petroleum gas (LPG) or natural compressed gas (NCG).

These catalytic phases cause the reduction of the nitrogen oxides with high conversion ratios at much lower temperatures than those required using conventional catalysts prepared by exchange with transition metals, in particular copper, on zeolites, and with nitrogen yields which are improved with respect to catalysts prepared using precious metals (metals from the platinum group) on different supports.

We have developed catalytic phases which activate the reduction of nitrogen oxides (NO and $NO_2$) to molecular nitrogen ($N_2$) in accordance with the following equations:

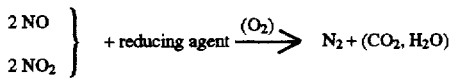

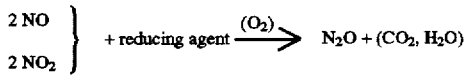

The majority of work in developing catalysts which are active in eliminating nitrogen oxides in an oxidizing medium has been based on the use of transition metals (generally copper) exchanged on zeolites with atomic ratios Si/Al which are generally between 3 and 100 and with structures which may be different (mordenite, faujasite, ZSM5, etc). Those catalysts are active in converting nitrogen oxides at temperatures of between 350° C. and 550° C. Those conditions thus limit their use to depolluting the exhaust gases from lean burn petrol engines and heavy duty Diesel engines when operating at full load and high speed. Unfortunately, the temperature of the exhaust gases from light Diesel engined cars is generally between 150° C. and 300° C. and rarely exceeds 500° C.

It should be noted, however, that those catalysts are highly selective for the total reduction of nitrogen oxides to molecular nitrogen.

The use of precious metals from the platinum group as the active phase can produce conversion rates for these nitrogen oxides which are comparable to those observed with copper catalysts. Those catalytic phases have the advantage of being active at low temperatures (200° C.–300° C.), which means they can be used to depollute the exhaust gases from small Diesel engined vehicles.

The precious metals can be impregnated into different supports such as alumina, silica, zirconia, titanium oxide or zeolites, or perovskites (EP-A-0 455 491). They can also be introduced into a composite oxide (perovskite, for example) either by impregnation into the support, or by addition with the other materials which form the mixed oxide (EP-A-0 525 677).

The catalysts are generally very active at low temperatures for converting nitrogen oxides NO and $NO_2$, but unfortunately this reduction is only partial, i.e., the reaction product is essentially nitrous oxide ($N_2O$).

SUMMARY OF THE INVENTION

The aim of the present invention is to provide catalysts with comparable, if not superior, efficiencies to those of the above formulations, for the elimination of nitrogen oxides at low temperatures in a highly oxidizing gaseous mixture which also exhibit substantially improved molecular nitrogen yields. This improvement is obtained by reducing the selectivity for the reduction of nitrogen oxides to nitrous oxide ($N_2O$) and as a consequence, by an increase in the selectivity for $N_2$.

We thus propose, in order to improve the nitrogen yield in the reduction of nitrogen oxides in exhaust gases which are superstoichiometric in oxygen, the use of catalysts prepared by depositing at least one precious metal from the platinum group (Pt, Pd, Rh, Ir, Ru, Os, Re) and at least one noble metal, silver and/or gold, on an inorganic refractory oxide modified by the addition of at least one rare-earth and at least one alkaline-earth metal element.

Catalysts containing precious metals (generally platinum, palladium and rhodium or mixtures thereof), alkaline-earths metals and rare-earths have already been described for depolluting exhaust gases from internal combustion engines. In general, they are used for three-way catalysts, i.e., with gas compositions which are stoichiometric or close to chemical equilibrium between the oxidizing compounds and the reducing compounds (JP-A-05/237384, EP 507,590 and EP 199,509). In these catalysts, the addition of these alkaline-earth metals and rare-earth elements is intended to improve the thermal stability of the catalyst and increase its lifetime.

A catalyst has been proposed in which platinum and lanthanum are deposited on a porous support to eliminate pollutants, among them $NO_x$, from an exhaust gas containing excess oxygen (JP-A-05/168862).

Further, JP-A-05/317721 describes the deposition of precious metals (platinum group) on a zeolite containing rare-earths and alkaline-earth metals elements. Those catalysts, doped with those two elements, are more active in eliminating nitrogen oxides at low temperatures and have better thermal stability.

The same additives are also described in EP 562,516, which indicates that the formation of a compound of the type $BaLa_2O_4$ is considered to prevent the interaction of lanthanum and alumina, thus encouraging a better dispersion of the precious metals and limiting its sintering, in particular when the gaseous mixture is highly oxidizing.

In order to achieve the activity and selectivity objectives while reducing the molar ratio (reducing agent/nitrogen oxide), we propose the use, in the catalytic system, of at least one precious metal from the platinum group and at least one noble metal, silver and/or gold. These metals are dispersed on at least one inorganic refractory oxide modified by the addition of at least one element from the group formed by the rare-earths and at least one element from the group formed by the alkaline-earth metals. This catalyst can cause elimination of the nitrogen oxides present in a gas which is superstoichiometric in oxidizing agents, in particular oxygen, by reduction by means of reducing agents present in the medium, or injected upstream of the catalyst. The reaction is carried out at low temperature with a high yield of molecular nitrogen and low selectivity for nitrous oxide, which is an undesirable product.

These active phases (or catalytic phases) are in the form of spherules, pellets or extrudates. They may also be deposited on monolithic supports of ceramic or metal.

In accordance with the present invention, the composition of the catalytic phase (or active phase), prepared in the form of spherules, extrudates or pellets or deposited on a monolithic support, expressed as the percentage by weight with respect to the total anhydrous weight of this active phase, calcined at 1000° C. for 4 hours, is as follows:

50% to 99.78% of at least one inorganic refractory oxide;
0.1% to 20% of at least one element (A) from the group formed by the rare-earths, expressed as the oxide;
0.1% to 15% of at least one element (B) from group IIA of the alkaline-earth metal, expressed as the oxide;
0.01% to 5% of at least one metal (C) from the group formed by the precious metals of the platinum group; and
0.01% to 10% of at least one metal (D) from the group formed by the noble metals silver and gold.

Advantageously, the composition by weight of the catalytic phase, expressed as the percentage by weight with respect to the anhydrous weight, calcined at 1000° C. for 4 hours, is as follows:

67% to 98.3% of at least one inorganic refractory oxide;
1% to 15% of at least one element (A) from the group formed by the rare-earths, expressed as the oxide;
0.5% to 10% of at least one element (B) from group IIA of the alkaline-earths, expressed as the oxide;
0.1% to 3% of at least one metal (C) from the group formed by the precious metals of the platinum group; and
0.1% to 5% of at least one metal (D) from the group formed by the noble metals silver and gold.

The catalysts of the invention, which are active for the selective reduction of nitrogen oxides in an oxygen-rich medium, can be in the form of spherules, pellets or extrudates.

The preparation process comprises different discrete steps, as follows:

a) at least one step for impregnating a support constituted by at least one inorganic refractory oxide, with all or a portion of at least one precursor of at least one rare-earth (A) and/or with all or a portion of at least one precursor of at least one alkaline-earth metal (B), optionally with at least a portion of at least one precursor of at least one precious metal (C), and optionally with at least a portion of at least one precursor of at least one noble metal (D);

b) at least one second impregnation step using any remaining precursors of at least one rare-earth (A) and/or using at least one alkaline-earth metal (B), optionally using all or a portion of the remainder of at least one precursor of at least one precious metal (C), and optionally using all or a portion of the remainder of at least one precursor of at least one noble metal (D);

c) at least one third impregnation step using all or a portion of any remaining at least one precursor of at least one precious metal (C) and/or using all or a portion of any remaining at least one precursor of at least one noble metal (D);

d) at least one fourth impregnation step using any remaining at least one precursor of at least one noble metal (D) and/or using any remaining at least one precursor of at least one precious metal (C); and e) a heat treatment step in an oxidizing, neutral or reducing medium after each impregnation step, carried out at a temperature in the range 200° C. and 900° C.

For use in a vehicle, it is normally preferable to use rigid supports (monoliths) with a large open porosity (over 70%) to limit pressure drops which could cause high gas flow rates, in particular high space velocities of the exhaust gases. These pressure drops are detrimental to the operation of the engine and contribute to reducing the efficiency in an internal combustion engine (petrol or Diesel). Further, since the exhaust system is subjected to vibrations and large mechanical and thermal shocks, a catalyst in the form of spherules, pellets or extrudates could deteriorate either by attrition or by fracturing.

These monoliths can be:
either of ceramic, where the principal elements may be alumina, zirconia, cordierite, mullite, silica, aluminosilicates or a combination of several of these compounds;
or of silicon carbide and/or nitride;
or of aluminium titanate;
or of metal; they are produced from alloys of iron, chromium and aluminium which may be doped with nickel, cobalt, cerium or yttrium; the most renowned are sold under the trade names FECRALLOY$^R$ and KANTHAL$^R$.

The metallic supports can be formed by rolling up corrugated strips or by layering corrugated metallic sheets, to constitute a honeycomb structure with straight or zig-zagged channels, which may or may not communicate with each other. They may also be formed from interlaced metallic wires or fibers, which may be woven or meshed.

For metal supports containing aluminium in their composition, a high temperature pretreatment (for example at a temperature in the range 700° C. to 1100° C.) is recommended to develop a micro-layer of refractory alumina at the surface. This superficial micro-layer, which has a porosity and specific surface area which is greater than that of the original metal, encourages the attachment of the active phase while protecting the remainder of the support against corrosion.

The catalysts are prepared by coating the monolithic supports with a suspension containing all or a portion of the elements constituting the catalytic phase. The elements which are not introduced in the preceding steps are impregnated into the coated monolith in one or more steps in the form of a solution of their precursor salts.

When this active phase is deposited on a monolithic support (or substrate), the quantity of material fixed on the support is generally between 20 g and 300 g, advantageously between 50 g and 200 g per liter of said support.

The steps of a method for the preparation of the catalyst of the invention on a monolithic support involve coating the support with the inorganic refractory oxide, then successively impregnating the precursors of the different elements constituting the catalytic phase. Each impregnation step is followed by a specific heat treatment step to stabilize and condition the phase which has been formed into a state where interaction with the following phase is optimized.

The inorganic refractory oxide is generally selected from the group formed by at least one of the following compounds: alpha alumina, beta alumina, delta alumina, gamma alumina, khi alumina, theta alumina, silicas, silica-aluminas, zeolites, titanium oxide or zirconium oxide, and their combinations, mixed oxides or solid solutions containing at least two of the above oxides. Aluminas which have both a relatively large specific surface area, in general 10 to 250 $m^2/g$, preferably 50 to 150 $m^2/g$, and a thermal stability which is adapted to the operating conditions of the catalysts, are preferably used.

The inorganic oxide is coated onto the ceramic or metallic monolithic support using a technique which is known to the skilled person. It consists of preparing an aqueous suspension of the oxide with an inorganic or organic compound which can fix the oxide on the support. This compound, termed a binder, is generally an alumina gel (boehmite) or a silica sol, which is added to the suspension containing an organic or inorganic acid (peptizing agent). The oxide is deposited by immersing the monolith in the suspension, circulating the suspension through the monolith or by spraying the suspension onto the monolith. After elimination of excess suspension, the oxide film is fixed on the support by drying then calcining the assembly at a temperature which is generally in the range 300° C. to 900° C., preferably in the range 400° C. to 700° C.

In order to ensure that the precious metals interact less with the inorganic refractory oxide (an interaction which is encouraged by acidity in the support), elements are added which have a basic character which readily exchange with the acidic sites of the oxide. Of these agents, we prefer elements (A) from the group formed by the rare-earths, but also elements (B) from group IIA of the alkaline-earth metal.

These elements are added to the inorganic refractory phase either in the form of pigments (salts or oxides) or, and preferably, by successive impregnations of at least one soluble salt of at least one element from each of the two groups, or by co-impregnation of at least one soluble salt of at least one element of each of the two groups (alkaline-earth metals and rare-earths).

In the rare-earth group (A), the preferred elements are lanthanum, neodymium and praseodymium or a mixture of at least two of these elements, and preferably lanthanum.

The compounds of rare-earths (A) introduced in the form of pigments are carbonates, oxalates or sulphates; preferably, however, impregnation is carried out using an aqueous solution of at least one of their precursors such as the nitrates.

The content of rare-earth (A) in the finished catalyst, expressed as the oxide, is in the range 0.1% to 20%, preferably in the range 2% to 15% by weight with respect to the total weight of the catalytic phase.

Heat treatment is generally carried out in the range 200° C. to 900° C., preferably in the range 300° C. to 900° C., to decompose the precursor to the oxide and mixed compound form after reaction with the refractory oxide.

In group IIA of the alkaline-earth metals (B), we prefer to use calcium, barium, strontium or a mixture of at least two of these elements, more preferably barium.

These elements can be introduced in the form of pigments such as oxides, carbonates or sulphates. Preferably, however, precursors of these elements are impregnated into the refractory oxide. In this case, preferred water-soluble salts are nitrates, acetates and formates. The content of the alkaline-earth metals elements (B) in the finished catalyst, expressed as the oxide, is in the range 0.1% to 15%, preferably in the range 2% to 10% by weight with respect to the total weight of the catalytic mass.

The element which is the most active in eliminating nitrogen oxides, more particularly for their reduction in an oxidizing medium, is precious metal (C). From the group formed by platinum, palladium, rhodium, ruthenium, iridium, rhenium and osmium, we prefer to use platinum, ruthenium or iridium or a mixture of at least two of these elements.

Addition of element (C) from the group formed by the precious metals can be effected by introducing a precursor of the metal at the same time as the precursor of the alkaline-earth element (B) and/or the element from the group formed by the rare-earths (A). However, we prefer to first stabilize the modified refractory oxide thermally by calcining, carried out at a temperature in the range 200° C. to 90° C., preferably in the range 300° C. to 900° C., before impregnating with the precursor of the precious metal.

The precursors of precious metals (C) are those conventionally used for the preparation of catalysts, in particular and when they exist, chlorides, the homologous acids of the chlorides, chlorine-containing complexes, nitrates, amine complexes, and acetylacetonates. Non limiting examples are hexachloro-platinic acid, platinum tetramine chloride, dinitroso-diamino platinum, hexachloroiridic acid, ruthenium trichloride, and ruthenium pentamine dichloride.

The content of the precious metal (C) in the finished catalyst is in the range 0.01% to 5%, preferably in the range 0.1% to 3% by weight with respect to the total weight of the catalytic phase.

Heat treatment can be carried out in an atmosphere which is oxidizing (in air, diluted to a greater or lesser extent by nitrogen) and neutral (in nitrogen). We prefer, however, to carry out the heat treatment in a slightly reducing atmosphere, for example in hydrogen diluted with an oxygen-lean combustion gas.

The temperature of the reducing heat treatment after drying is generally in the range 200° C. to 900° C., preferably in the range 300° C. to 700° C.

The reducing atmosphere of the medium must be equivalent to correspond to a hydrogen content in the range 0.01% to 5% by volume in the treatment gas, preferably in the range 0.1% to 1% by volume. Thus, for a combustion mixture (air+natural gas) which can directly heat the treating furnace, the sub-stoichiometry of oxygen with respect to the quantity required for total combustion of the combustion gas must be less than 0.005% to 2.5%, preferably 0.05% to 0.5%.

Addition of noble metal (D), which unexpectedly reinforces conversion of nitrogen oxides to the formation of molecular nitrogen to the detriment of the undesired formation of nitrous oxide, can optionally be carried out at the same time as that of the precious metal, by co-impregnation. However, the selectivity of the catalyst is improved if noble metal (D) is introduced after the above treatment, and preferably and unexpectedly, if this introduction is carried out in a neutral or slightly reducing atmosphere.

The two noble metals (D), gold and/or silver, are introduced by impregnating a solution of their precursors which are soluble in aqueous or hydrocarbon media. Silver nitrate and chloro-auric acid are generally used.

The content of noble metal (D) in the finished catalyst is in the range 0.01% to 10%, preferably in the range 0.1% to 5% by weight with respect to the total weight of the catalytic phase.

The final treatment can be carried out in an atmosphere which is oxidizing, neutral or slightly reducing, at a temperature which is generally in the range 200° C. to 900° C., preferably in the range 300° C. to 700° C.

Examples 1, 5, and 7 to 11 below illustrate the invention without in any way limiting its scope. In the examples, only the direct preparation of the catalysts on a monolithic support is described. However, these phases can also be prepared using supports in the form of spherules, extrudates or pellets, preformed before preparation, or subsequently formed by bowl granulation, extrusion or pelletizing.

Examples 2 to 4 and 6 describe the preparation of prior art catalysts. They were tested, for comparison, in Examples 12 and 13.

EXAMPLES

Example 1 (Invention)

250 g of alumina binder (boehmite) in powder form was dispersed in 2500 cm$^3$ of distilled water containing the equivalent of 18 g of nitric acid. 850 g of alumina filler (gamma alumina) with a specific surface area of 110 m$^2$/g was then introduced.

The suspension was ground to produce an average granulometry in the solid particles of less than 10 microns.

A 0.904 litre ceramic monolith with a honeycomb structure with a density of 62 cells per cm$^2$, sold by Corning, was coated with this suspension. This operation was carried out by immersing the support in the medium for several seconds, shaking and air blowing to eliminate the excess product which obstructed the channels. The support, coated with a film of material, was dried and calcined at 600° C. to fix the coating (wash coat) to the support.

After a second coating operation, the amount of wash coat was 110 g per liter of support.

An equimolar aqueous solution of lanthanum nitrate and barium nitrate was prepared with a concentration of 0.5 mole per.

The alumina-coated monolith was impregnated with this solution of nitrates then dried at 120° C. for 2 hours and calcined at 700° C. for 4 hours.

After calcining, the contents by weight of lanthanum and barium, expressed as the oxide equivalent ($La_2O_3$ and $BaO$) with respect to the coated and impregnated alumina layer of the finished catalyst, were respectively 7.4% and 5.7% by weight.

This monolith was then impregnated with a solution of hexachloro-platinic acid such that, after drying and heat treatment, the platinum content, expressed with respect to the volume of the coated and impregnated monolith, was 1 g per liter.

Heat treatment was carried out in a reducing atmosphere with a composition by volume of 1% of hydrogen in nitrogen. The treatment temperature was between room temperature and 600° C.

The coated monolith was then brought into contact with a solution of chloro-auric acid such that the gold content after heat treatment was 0.25 g per liter of substrate.

Final heat treatment was carried out in air at between room temperature and 500° C.

Example 2 (Comparative)

The catalyst of Example 1 was reproduced with the exception that the chloro-auric solution impregnation step was deleted. The platinum content was 1 g per liter of substrate.

Example 3 (Comparative)

The catalyst of Example 1 was reproduced with the exception that the alumina-coated monolith was impregnated with a solution which contained only lanthanum nitrate, then after calcining with a solution of chloro-platinic acid.

The concentration of lanthanum oxide was 7.4% by weight with respect to the coated and impregnated alumina layer of the finished catalyst, and the platinum content was 1 g per liter of substrate.

Example 4 (Comparative)

The catalyst of Example 1 was reproduced with the exception that the alumina-coated monolith was impregnated with a solution which contained only barium nitrate, then after calcining with a solution of chloro-platinic acid.

The concentration of barium oxide was 5.7% by weight with respect to the coated and impregnated alumina layer of the finished catalyst, and the platinum content was 1 g per liter of substrate.

Example 5 (Invention)

The catalyst of Example 1 was reproduced with the exception that the alumina impregnating solution contained 1 mole/l of barium nitrate and 1.5 mole/l of lanthanum nitrate.

After calcining, the content of lanthanum and barium, expressed as the oxide equivalent ($La_2O_3$ and $BaO$) with respect to the coated and impregnated alumina layer of the finished catalyst, was 17.3% by weight of lanthanum oxide and 9.1% by weight of barium oxide.

The platinum introduction step was identical to that described in Example 1. Impregnation with the chloro-auric acid was replaced by that of a solution of silver nitrate such that the silver content in the finished catalyst was 0.5 g per liter of substrate.

Example 6 (Comparative)

The catalyst of Example 1 was reproduced with the exception that the chloro-platinic acid introduction step was deleted.

Example 7 (Invention)

The catalyst of Example 1 was reproduced with the exception that the alumina impregnating solution contained 0.5 mole/l of calcium nitrate and 1.5 mole/l of lanthanum nitrate.

After calcining, the content of lanthanum and calcium, expressed as the oxide equivalent ($La_2O_3$ and CaO) with respect to the coated and impregnated alumina layer of the finished catalyst, was 17.3% by weight of lanthanum oxide and 2.1% by weight of calcium oxide.

Instead of impregnating with a solution of platinum alone, impregnation was carried out using a mixed solution of chloro-platinic acid and chloro-iridic acid such that the respective contents of platinum and iridium were 0.8 g and 0.2 g per liter of substrate.

Impregnation of the chloro-auric solution was identical to that described in Example 1, with the exception that the concentration of the solution was adjusted so that the gold content in the finished catalyst was 0.5 g per liter of substrate.

Example 8 (Invention)

The catalyst of Example 1 was reproduced with the exception that the alumina impregnating solution contained 0.35 mole/l of strontium nitrate and 1.3 mole/l of lanthanum nitrate.

After calcining, the content of lanthanum and strontium, expressed as the oxide equivalent ($La_2O_3$ and SrO) with respect to the coated and impregnated alumina layer of the finished catalyst, was 15.1% by weight of lanthanum oxide and 2.5% by weight of strontium oxide.

Instead of impregnating with a solution of platinum alone, impregnation was carried out using a mixed solution of chloro-platinic acid and ruthenium chloride such that the platinum content was 0.85 g and the ruthenium content was 0.15 g per liter of substrate.

Impregnation of the silver nitrate solution was identical to that described in Example 5, with the exception that the concentration of the solution was adjusted so that the silver content in the finished catalyst was 1 g per liter of substrate.

Example 9 (Invention)

A mixed solution of lanthanum nitrate, praseodymium nitrate and barium nitrate was impregnated into gamma type alumina spherules with a specific surface area of 110 $m^2/g$ such that the concentrations by weight of these oxides on the alumina were respectively 5% ($La_2O_3$), 2.5% ($Pr_6O_{11}$) and 3.5% (BaO).

After calcining, this alumina was impregnated with a solution of chloro-platinic acid such that the platinum content was 1.3% by weight.

After reducing heat treatment identical to that described in Example 1, the spherules were impregnated with a chloro-auric acid solution such that the gold content on the spherules after calcining was 0.5% by weight.

These spherules were then ground then coated using the method described in Example 1, but the ceramic support was replaced with a coiled metallic support from ROSI, which had been oxidized at 900° C.

Coating was carried out three times to deposit the equivalent of 150 g of active phase per liter of substrate on the metallic substrate.

Example 10 (Invention)

The catalyst of Example 9 was reproduced on a metallic layered type monolith with straight or zig-zagged channels from ROSI, with the following exceptions:

the alumina was impregnated with a solution of lanthanum nitrate and neodymium nitrate, then calcined and re-impregnated with a strontium nitrate solution. The contents by weight of oxides in the active phase of the finished catalyst were respectively 5% ($La_2O_3$), 3% ($Nd_2O_3$) and 5.5% (SrO);

the platinum salt impregnated into the modified alumina was dinitroso-diamino platinum and the metal content was calculated such that the quantity was 0.5 g per liter of substrate; and the noble metals were added by successive impregnations onto the coated monolith of silver nitrate then chloro-auric acid such that the respective contents were 0.6 g of silver and 0.4 g of gold per liter of substrate.

Example 11 (Invention)

A suspension constituted by a mechanical mixture of theta alumina, titanium oxide and zirconia in respective proportions by weight of 75% ($Al_2O_3$), 15% ($TiO_2$) and 10% ($ZrO_2$) was coated onto a metallic fibrous structured support. Coating was effected using a silica gel (ludox) instead of an alumina binder (boehmite) and the acid used was acetic acid (pH=5.2). The silica content in the finished catalyst (active phase deposited on the metallic substrate) was 10% by weight.

A solution of dinitroso-diamino platinum was impregnated into the coated monolith such that the platinum content in the finished catalyst corresponded to 1 g of platinum per liter of substrate.

After heat treatment in a reducing mixture (1% hydrogen in nitrogen at a temperature in the range 25° C. to 500° C.), an equivalent of 1 g of silver per liter of substrate was impregnated into the substrate in the form of a solution of silver nitrate, followed by drying and calcining in air of the coated and impregnated substrate at a temperature of 600° C.

The weight and the composition by weight of the active phase deposited on the ceramic or metallic support (inorganic refractory oxides, rare-earth (A) oxides, elements from the group formed by rare-earths (B), precious metals (C) and noble metals (D) are collected in Table I.

TABLE I

Composition by weight of the active phase of the catalyst (oxides + metals – support)
(content per liter of substrate and percentage by weight in the catalytic phase)

| catalyst | inorganic oxide | La₂O₃ | Nd₂O₃ | Pr₆O₁₁ | BaO | SrO | CaO | Pt | Ru | Ir | Au | Ag |
|---|---|---|---|---|---|---|---|---|---|---|---|---|
| 1 (inv.) | 85,923 | 7,4 | | | 5,7 | | | 0,781 | | | 0,195 | |
| (128,021 g/l) | (110) | (9,473) | | | (7,297) | | | (1) | | | (0,25) | |
| 2 (comp.) | 86,117 | 7,4 | | | 5,7 | | | 0,783 | | | | |
| (127,733 g/l) | (110) | (9,472) | | | (7,281) | | | (1) | | | | |
| 3 (comp.) | 91,560 | 7,4 | | | | | | 0,832 | | | 0,208 | |
| (120,140 g/l) | (110) | (8,890) | | | | | | (1) | | | (0,25) | |
| 4 (comp.) | 93,240 | | | | 5,7 | | | 0,848 | | | 0,212 | |
| (117,974 g/l) | (110) | | | | (6,725) | | | (1) | | | (0,25) | |
| 5 (inv.) | 72,610 | 17,3 | | | 9,1 | | | 0,660 | | | | 0,330 |
| (151,494 g/l) | (110) | (26,208) | | | (13,786) | | | (1) | | | | (0,5) |
| 6 (comp.) | 73,267 | 17,3 | | | 9,1 | | | | | | | 0,333 |
| (150,136 g/l) | (110) | (25,974) | | | (13,662) | | | | | | | 0,5 |
| 7 (inv.) | 79,516 | 17,3 | | | | | 2,1 | 0,578 | | 0,144 | 0,361 | |
| (138,337 g/l) | (110) | (23,932) | | | | | (2,905) | (0,8) | | (0,2) | (0,5) | |
| 8 (inv.) | 80,929 | 15,1 | | | | 2,5 | | 0,625 | 0,110 | | | 0,736 |
| (135,922 g/l) | (110) | (20,524) | | | | (3,98) | | (0,85) | (0,15) | | | (1) |
| 9 (inv.) | 89,12 | 4,25 | | 2,125 | 2,975 | | | 1,105 | | | 0,425 | |
| (150.0 g/l) | (133,68) | (6,375) | | (3,187) | (4,462) | | | (1,658) | | | (0,637) | |
| 10 (inv.) | 85,336 | 5 | 3 | | | 5,5 | | 0,388 | | | 0,465 | 0,310 |
| (128,902 g/l) | (110) | (6,445) | (3,867) | | | (7,090) | | (0,5) | | | (0,6) | (0,4) |
| 11 (inv.) | 88,831 | 4,5 | | 2,25 | 3,15 | | | 0,634 | | | | 0,635 |
| (157,603 g/l) | (140) | (7,092) | | (3,546) | (4,964) | | | (1) | | | | (1) |

Example 12

Catalysts prepared on ceramic supports were tested in the laboratory in a micro-unit with a mixture of a synthetic gas containing the main groups of compounds present in exhaust gases from a Diesel engine. The operating conditions were as follows:

| | |
|---|---|
| space velocity: (VVH) | 10000 h⁻¹ |
| composition of mixture: | |
| $NO_x$: | 600 ppm |
| Hydrocarbons: | 6000 ppm C (methane equivalent) |
| $O_2$: | 5% |
| $CO_2$: | 10% |
| CO: | 500 ppm |
| $H_2O$: | 10% |
| $SO_2$: | 20 ppm |
| $N_2$: | complement to 100% |
| temperature: | rising from 150° C. to 500° C. (5° C. per min) |

Analysis of the principal components was carried out continuously at the reactor outlet by infra-red detectors for carbon monoxide (CO) and nitrous oxide ($N_2O$), flame ionization for the hydrocarbons (HC) and chemiluminescence for the nitrogen oxides (NO and $NO_2$).

These analysis results allowed the development of nitrogen oxides conversions, of the selectivity to nitrous oxide and the nitrogen yield to be determined as a function of the development of the reaction temperature.

The formulae used to calculate these three parameters (expressed as %) were as follows:

$$NO_x \text{ conversion: } C = 100 \times \frac{(NO_x \text{ inlet} - NO_x \text{ outlet})}{NO_x \text{ inlet}}$$

$$N_2O \text{ selectivity: } S = 100 \times \frac{(2 \times N_2O \text{ formed})}{NO_x \text{ removed}}$$

$$N_2 \text{ yield: } R = C \times (100 - S)/100$$

Table II below shows the temperatures and the three parameters defined above calculated for the test conditions corresponding to the lowest $NO_x$ emissions at the catalyst outlet (highest conversion).

TABLE II

Catalytic tests in micro-unit

| Catalyst | Composition | Max $NO_x$ conversion (%) | Selectivity $N_2O$ (%) | Yield $N_2$ (%) | max conversion temperature (°C.) |
|---|---|---|---|---|---|
| 1 (inv.) | $Al_2O_3$ La—Ba Pt—Au | 70 | 28 | 50,4 | 270 |
| 2 (comp.) | $Al_2O_3$ La—Ba Pt | 72 | 39 | 43,9 | 265 |
| 3 (comp.) | $Al_2O_3$ La Pt—Au | 69 | 42 | 40,0 | 265 |
| 4 (comp.) | $Al_2O_3$ Ba Pt—Au | 66 | 45 | 36,3 | 280 |
| 5 (inv.) | $Al_2O_3$ La—Ba Pt—Ag | 65 | 24 | 49,4 | 275 |
| 6 (comp.) | $Al_2O_3$ La—Ba Ag | 20 | 83 | 16,6 | 410 |
| 7 (inv.) | $Al_2O_3$ La—Ca Pt—Ir—Au | 67 | 30 | 46,9 | 260 |
| 8 (inv.) | $Al_2O_3$ La—Sr Pt—Ru—Ag | 63 | 22 | 49,1 | 255 |

It can be seen that the maximum conversions and the lowest temperatures for achieving these maxima were not always in favor of the catalysts of the invention. However, the objective of eliminating nitrogen oxide from the exhaust gas was to reduce them to inert molecular nitrogen ($N_2$), and not to transform them to nitrous oxide ($N_2O$) which is an undesirable, pollutant by-product.

As a consequence, the catalysts of the invention are thus the highest performers in reducing all of the oxygen-containing nitrogen compounds to molecular nitrogen: the N₂O selectivities were the lowest and the nitrogen yields were the highest.

Example 13

Catalysts prepared on metallic supports were tested on a test bench equipped with a Diesel engine of average cylinder size (1.9 liters). The engine speed was kept constant (2300 rpm). In order to increase the temperature of the exhaust gas, the engine load was gradually increased using a hydraulic brake.

Under these conditions, the emissions of nitrogen oxides and unburned or partially oxidized hydrocarbons varied only slightly: the contents were respectively 200 to 300 ppm of $NO_x$ and 50 to 150 ppm C (methane equivalent).

In order to enable a significant portion of the nitrogen oxides to be eliminated by catalytic reduction, additional gas oil was injected upstream of the catalyst so that the concentration thereof in the exhaust gas before catalysis was equivalent to 3000 ppm C (methane equivalent). The space velocity of the reactants over the catalyst was kept practically constant and equal to 30000 $h^{-1}$ and the temperature of the gas at the catalyst inlet was between 250° C. and 500° C.

Table III summarizes the performances obtained with these catalysts, in particular the maximum conversion rates for the nitrogen oxides and the temperatures at which these were obtained.

TABLE III

Catalytic tests on a Diesel engine (test bench)

| Catalyst | Composition | Support | Max $NO_x$ conversion (%) | max conversion temperature (°C.) |
|---|---|---|---|---|
| 1 | Al₂O₃ La—Ba Pt—Au | ceramic | 47 | 244 |
| 9 | Al₂O₃ La—Pr—Ba Pt—Au | coiled metal | 38 | 232 |
| 10 | Al₂O₃ La—Nd—Sr Pt—Au—Ag | layered metal | 46 | 265 |
| 11 | Al₂O₃—TiO₂ ZrO₂—SiO₂ La—Pr—Ba Pt—Au | fibrous metal | 42 | 249 |

It can be seen that the conversion rates for the nitrogen oxides in the exhaust gases from a Diesel engine with the catalysts of the invention and under the operating conditions defined above were about 40% to 50% for temperatures between about 230° C. and 265° C.

We claim:

1. A catalyst which is active and selective for reducing nitrogen oxides to molecular nitrogen, by reducing agents, in a medium which is superstoichiometric in oxidizing agents, said catalyst comprising a catalytic phase optionally supported on a substrate, which catalytic phase contains a carrier and an active phase, said catalytic phase comprising expressed as percentage by weight of the catalytic phase calcined at 1000° for 4 hours:

50% to 99.78% of at least one inorganic refractory oxide;
0.1% to 20% of at least one rare-earth element (A), expressed as the oxide;
0.1% to 15% of at least one alkaline earth metal element (B) from group IIA of the periodic table, expressed as the oxide;
0.01% to 5% of at least one platinum group metal (C); and
0.01% to 10% of at least one metal (D) which is silver or gold.

2. A catalyst according to claim 1, wherein the inorganic refractory oxide is alpha alumina, beta alumina, delta alumina, gamma alumina, khi alumina, theta alumina, a silica, a silica-alumina, a zeolite, titanium oxide, zirconium oxide or a mixture or solid solution thereof.

3. A catalyst according to claim 2, wherein the inorganic refractory oxide is alpha alumina, beta alumina, delta alumina, gamma alumina, khi alumina or theta alumina.

4. A catalyst according to claim 1 wherein element (A) is lanthanum, neodymium, praseodymium or a mixture of at least two thereof.

5. A catalyst according to claim 4, wherein element (A) is lanthanum.

6. A catalyst according to claim 1 wherein element (B) is calcium, barium, strontium or a mixture of at least two thereof.

7. A catalyst according to claim 6, wherein element (B) is barium.

8. A catalyst according to claim 1 wherein metal (C) is platinum, ruthenium, iridium or a mixture of at least two thereof.

9. A catalyst according to claim 8, wherein element (C) is platinum.

10. A catalyst according to claim 1 having a composition by weight of the catalytic phase, after calcination at 1000° C. for 4 hours of:

67% to 98.3% of at least one inorganic refractory oxide;
1% to 15% of at least one rare-earth element (A), expressed as the oxide;
2% to 10% of at least one alkaline earth metal element (B) from group IIA of the periodic table, expressed as the oxide;
2% to 3% of at least one platinum group metal (C); and
0.1% to 5% of at least one metal (D) which is silver or gold.

11. A catalyst according to claim 1 wherein the catalytic phase is in the form of spherules, extrudates or pellets.

12. A catalyst according to claim 1 wherein the catalytic phase is supported on a monolithic substrate.

13. A catalyst according to claim 12, wherein said monolithic substrate is a ceramic or a metal.

14. A catalyst according to claim 13, wherein the metallic substrate has a coiled or layered structure each with straight or zig-zagged channels, or a fibrous structure.

15. A catalyst according to claim 12, wherein the catalytic phase on the monolithic substrate has a weight of 20 g to 300 g per liter of substrate.

16. A catalyst according to claim 12, wherein the catalytic phase on the monolithic substrate has a weight of 50 g to 200 g per liter of substrate.

17. A process for the preparation of a catalyst in accordance with claim 1 comprising:

a) at least one first impregnation of a support constituted by said at least one inorganic refractory oxide, with all or a portion of at least one precursor of said at least one rare-earth (A) and/or with all or a portion of at least one precursor of said at least one alkaline-earth metal (B), optionally with a portion of at least one precursor of said at least one metal (C), and optionally with a portion of at least one precursor of said at least one metal (D);

b) optionally at least one second impregnation using any remaining precursors of said at least one rare-earth (A) and/or said at least one alkaline-earth metal (B), optionally using all or a portion of any remainder of said at least one precursor of at least one metal (C), and optionally using all or a portion of any remainder of said at least one precursor of at least one metal (D);

c) optionally at least one third impregnation using all or a portion of any remaining said at least one precursor of at least one metal (C) and/or using all or a portion of any remaining said at least one precursor of at least one metal (D);

d) optionally at least one fourth impregnation using any remaining said at least one precursor of at least one metal (D) and/or using any remaining said at least one precursor of at least one metal (C); and e) a heat treatment in an oxidizing, neutral or reducing medium after each impregnation, carried out at a temperature in the range 200° C. and 900° C.

18. A process for the preparation of a catalyst according to claim 17, comprising:

a) impregnating a support constituted by said at least one inorganic refractory oxide by said precursors of at least one rare-earth (A) and at least one alkaline-earth metal (B);

a') first heat treatment carried out in the range of 200° C. to 900° C.;

b) impregnating said support with a precursor of said at least one metal (C);

b') a second heat treatment in a reducing medium carried out at a temperature in the range 200° C. to 900° C.;

c) impregnating of said support with a precursor of said at least one metal (D);

c') a third heat treatment in an oxidizing medium carried out at a temperature in the range 200° C. to 900° C.

19. A preparation according to claim 18, wherein a reducing atmosphere for the reducing heat treatment after impregnating the precursor of metal (C) having a hydrogen content in the range 0.01% to 5% by volume is used.

20. A preparation process according to claim 19, further comprising coating a monolithic substrate with said at least one refractory oxide before or after one or more of (a) to c').

21. A preparation process according to claim 18, further comprising coating a monolithic substrate with said at least one refractory oxide before or after one or more of (a) to c').

22. A preparation process according to claim 17, further comprising coating a monolithic substrate with said at least one refractory oxide before or after one or more of (a) to (e).

23. A process according to claim 22, wherein the temperatures of the heat treatments after coating the inorganic refractory oxide with elements (A), (B), (C) and (D) are in the range 300° C. to 900° C.

24. A process according to claim 17 wherein the inorganic oxide has a specific surface area before impregnation step (a) in the range 10 to 250 m²/g.

25. In a method comprising catalytically reducing nitrogen oxides in an exhaust gas which is superstoichiometric in oxygen, the improvement comprising employing the catalyst of claim 1 to reduce said nitrogen oxides in said exhaust gas.

26. A method according to claim 25, wherein said exhaust gas is emitted by stationary engines, vehicles with Diesel engines, lean burn gasoline driven vehicles and turbines using natural gas or liquid fuel.

27. A method according to claim 25, wherein reducing compounds selected from the group consisting of hydrocarbon and oxygen-containing organic compounds are used to reduce the nitrogen oxides.

28. A catalyst prepared by a process comprising:

a) at least one first impregnation of a support constituted by at least one inorganic refractory oxide, with all or a portion of at least one precursor of at least one rare-earth (A) and/or with all or a portion of at least one precursor of at least one alkaline-earth metal (B), optionally with a portion of at least one precursor of at least one platinum group metal (C), and optionally with a portion of at least one precursor of said at least one metal (D) which is silver or gold;

b) optionally at least one second impregnation using any remaining precursors of said at least one rare-earth (A) and/or said at least one alkaline-earth metal (B), optionally using all or a portion of any remainder of said at least one precursor of at least one platinum group metal (C), and optionally using all or a portion of any remainder of said at least one precursor of at least one metal (D);

c) optionally at least one third impregnation using all or a portion of any remaining said at least one precursor of at least one platinum group metal (C) and/or using all or a portion of any remaining said at least one precursor of at least one metal (D);

d) optionally at least one fourth impregnation using any remaining said at least one precursor of at least one metal (D) and/or using any remaining said at least one precursor of at least one metal (C); and e) a heat treatment in an oxidizing, neutral or reducing medium after each impregnation, carried out at a temperature in the range 200° C. and 900° C.

29. A catalyst prepared by a process comprising:

a) impregnating a support constituted by at least one inorganic refractory oxide by said precursors of at least one rare-earth (A) and at least one alkaline-earth metal (B);

a') first heat treatment carried out in the range of 200° C. to 900° C.;

b) impregnating said support with a precursor of said at least one platinum group metal (C);

b') a second heat treatment in a reducing medium carried out at a temperature in the range 200° C. to 900° C.;

c) impregnating of said support with a precursor of at least one metal (D) which is silver or gold;

c') a third heat treatment in an oxidizing medium carried out at a temperature in the range 200° C. to 900° C.

30. A catalyst prepared by a process according to claim 29, wherein a reducing atmosphere for the reducing heat treatment after impregnating the precursor of metal (C) having a hydrogen content in the range of 0.1% to 5% by volume is used.

31. A catalyst which is active and selective for reducing nitrogen oxides to molecular nitrogen, by reducing agents, in a medium which is superstoichiometric in oxidizing agents, said catalyst comprising a catalytic phase optionally supported on a substrate, which catalytic phase contains a carrier and a unitary active phase, said catalytic phase comprising expressed as percentage by weight of the catalytic phase calcined at 1000° for 4 hours:

50% to 99.78% of at least one inorganic refractory oxide;
0.1% to 20% of at least one rare-earth element (A), expressed as the oxide;
0.1% to 15% of at least one alkaline earth metal element (B) from group IIA of the periodic table, expressed as the oxide;
0.01% to 5% of at least one platinum group metal (C); and
0.01% to 10% of at least one metal (D) which is silver or gold.

* * * * *